(12) United States Patent
Niu

(10) Patent No.: US 7,792,112 B2
(45) Date of Patent: Sep. 7, 2010

(54) SYSTEM, APPARATUS AND METHOD FOR CONTROLLING MULTICAST FLOW IN A PASSIVE OPTICAL NETWORK

(75) Inventor: Lehong Niu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 12/167,548

(22) Filed: Jul. 3, 2008

(65) Prior Publication Data
US 2008/0267626 A1    Oct. 30, 2008

Related U.S. Application Data

(63) Continuation of application No. PCT/CN2006/002803, filed on Oct. 20, 2006.

(30) Foreign Application Priority Data

Jan. 4, 2006    (CN)    ......................... 2006 1 0032696

(51) Int. Cl.
H04L 12/28    (2006.01)
(52) U.S. Cl. ........................ 370/390; 370/420; 370/432; 398/66; 398/69; 398/71
(58) Field of Classification Search ................. 370/432, 370/420, 389, 390; 398/66, 67, 58, 168
See application file for complete search history.

(56) References Cited

U.S. PATENT DOCUMENTS

| 6,970,461 | B2 | 11/2005 | Unitt et al. |
| 6,993,024 | B1 | 1/2006 | McDermott, III et al. |
| 7,450,551 | B2 | 11/2008 | Lim et al. |

2004/0240466 A1* 12/2004 Unitt et al. .................. 370/461

(Continued)

FOREIGN PATENT DOCUMENTS

CN    1483258 A    3/2004

(Continued)

OTHER PUBLICATIONS

PCT Written Opinion of the International Searching Authority (Jan. 11, 2007).

(Continued)

*Primary Examiner*—Ricky Ngo
*Assistant Examiner*—Rasheed Gidado
(74) *Attorney, Agent, or Firm*—Leydig, Voit & Mayer, Ltd.

(57) ABSTRACT

The present invention discloses a method for controlling multicast flow in passive optical network includes: receiving multicast data from the optical line terminal, determining whether the received multicast data satisfies a multicast right control condition, transmitting the multicast data to the user side if the received multicast data satisfies the multicast right control condition, or discarding the multicast data if the received multicast data does not satisfy the multicast right control condition. The present invention also discloses an optical network terminal, an optical line terminal, and a system consisting of an optical network terminal and an optical line terminal and an optical distribute network, which implement the above mentioned method. The present invention could prevent the optical network terminal from receiving illegal multicast data and enhance the multicast security of the whole passive optical network system.

13 Claims, 12 Drawing Sheets

U.S. PATENT DOCUMENTS

| | | | |
|---|---|---|---|
| 2005/0013314 A1* | 1/2005 | Lim et al. | 370/432 |
| 2005/0135365 A1* | 6/2005 | Sung et al. | 370/390 |
| 2005/0135808 A1 | 6/2005 | Yun et al. | |
| 2005/0265386 A1* | 12/2005 | Smith et al. | 370/466 |
| 2006/0018335 A1* | 1/2006 | Koch et al. | 370/432 |
| 2006/0120723 A1* | 6/2006 | Diouf et al. | 398/71 |
| 2006/0127091 A1* | 6/2006 | Yoo et al. | 398/69 |

FOREIGN PATENT DOCUMENTS

| | | |
|---|---|---|
| CN | 1540920 A | 10/2004 |
| CN | 1588950 A | 3/2005 |
| EP | 1 207 715 A2 | 5/2002 |
| EP | 1 499 155 A1 | 1/2005 |
| WO | WO 02/45334 A1 | 6/2002 |

OTHER PUBLICATIONS

State Intellectual Property Office of the People's Republic of China, Examination Report in Chinese Patent Application No. 200610032696.1 (Jan. 13, 2009).

* cited by examiner

SYSTEM, APPARATUS AND METHOD FOR CONTROLLING MULTICAST FLOW IN A PASSIVE OPTICAL NETWORK

CROSS-REFERENCE TO RELATED APPLICATIONS

This application is a continuation of International Patent Application No. PCT/CN2006/002803, filed Oct. 20, 2006, which claims priority to Chinese Patent Application No. 200610032696.1, filed Jan. 4, 2006, both of which are hereby incorporated by reference in their entirety.

FIELD OF THE INVENTION

The present invention relates to a technology in a passive optical network, especially to a system, apparatus and method for controlling multicast flow in a passive optical network.

BACKGROUND OF THE INVENTION

Broadband access technology mainly includes copper access technology (such as various digital subscriber line (DSL) technology) and optical access technology. The access network implemented by optical access technology is referred to as Optical Access Network (OAN). Based on different network deployment methods, OAN is classified into Fiber to The Home (FTTH), Fiber to The Building (FTTB), Fiber To The Business (FTTBusiness), Fiber To The Curb (FTTC) and Fiber To The Cabinet (FTTCab).

The Gigabit Passive Optical Network (GPON) is the latest technological standard for passive optical network (PON), and ITU_T Standard of GPON corresponds to a series of G984.1, G984.2, G984.3 and G984.4.

FIG. 1 shows the architecture of a GPON protocol stack, which is described as following:

A GPON Transmission Convergence (GTC) layer, includes two sub-layers:

TC Adapter Sub-layer, which, during downstream, is adapted to cut service data received in Asynchronous Transfer Mode (ATM) into ATM cells and cut service data received from a client in a GPON Encapsulation Mode (GEM) into GEM data blocks, and during upstream, adapted to assemble ATM cells or GEM data blocks in GTC frames into corresponding service data;

GTC Framing Sub-layer, which, during downstream, is adapted to assemble GTC TC frames, i.e., add CTC TC frame head ahead of the ATM cell or GEM data block based on control information of physical layer operation and maintenance (PLOAM) so as to form a complete GTC TC frame, deliver the GTC TC frame to a GPON Physical Media Dependent (GPM) layer, and during upstream, adapted to receive GTC TC frames from the GPM layer, remove the frame head, and deliver the GTC TC frames to the GTC Framing Sub-layer for further process.

A GPON Physical Media Dependent layer is adapted for GTC frame transmission through optical fiber;

A PLOAM physical layer is adapted for operation, management and maintenance of PON physical layer;

ONU Management and Control Interface (OMCI) is adapted for the control of OLT over ONT, wherein the data from OMCI is encapsulated into ATM cells or GEM data blocks for transmission in the same way as ordinary service data.

The GTC layer of GPON provides two modes for encapsulating service data, i.e., Asynchronous Transfer Mode (ATM) and GPON Encapsulation Mode (GEM): the ATM is to encapsulate the service data into ATM cells with 53 bytes; the GEM is a variable length encapsulation, which is capable of changing the length of a GEM encapsulation frame according to the length of service data frame.

Service data transmission includes unicast transmission and multicast transmission. The unicast transmission is point-to-point transmission and the multicast transmission is point-to-multipoint transmission. A PON system inherently supports point-to-multipoint transmission during downstream; therefore, a GPON system is advantageous in supporting multicast services, such as IP multicast services carried over Ethernet.

Before transmitting data, optical line terminal (OLT) and Optical Network Terminal (ONT) first negotiate a service transmission channel through OMIC control messages. The service transmission channel of ATM is referred to as Permanent Virtual Circuit (PVC), and the service transmission channel of GEM is referred to as GEM port. OLT assigns a Virtual Path Index (VPI) and Virtual Channel Index (VCI) of PVC for the ONT in an ATM mode; OLT assigns a port ID of GEM port in a GEM mode. AVPI/VCI and a port ID are globally unique, i.e., different VPIs/VCIs and port IDs are assigned for different service flows.

As for downstream unicast data transmission from OLT to ONT, since the data transmission from OLT to ONT in a PON system is in a broadcast mode, ONT receives data carried by all the ATM PVCs or GEM ports sent from OLT at TC Adapter Sub-layer of protocol stack. The ONT may not necessarily need to receive all the data. Accordingly, the TC Adapter Sub-layer of ONT provides data filter function in terms of ATM PVC or GEM port: OLT assigns a VPI/VCI or a port ID corresponding to the ONT for downstream data, and the ONT only receives downstream data carried by the corresponding VPI/VCI or a GEM port with the corresponding port ID, which are illustrated in FIG. 1 as VPI/VCI filtering entity and port ID filtering entity in the GPON protocol stack.

As for upstream unicast data transmission from ONT to OLT, ONT carries data in an ATM PVC or a GEM port according to VPI, VCI (in an ATM mode) or port ID (in an GEM mode) assigned by the OLT, and transmits the data within a specified transmission time window based on transmission time windows assigned by the OLT.

In the following description, a GEM mode is taken as an example to describe an embodiment of the present invention. It should be noted that the whole description for a GEM mode is also applicable to an ATM mode.

Transmission modes for downstream multicast data from OLT to ONT of GPON specified in G984.3 protocol may be:

1. All the downstream multicast flows from OLT are transmitted through a GEM port; or 2. The downstream multicast flows from OLT are transmitted through multiple GEM ports.

FIG. 2 is a schematic diagram illustrating the scheme that all the multicast flows are transmitted through a same GEM port. As shown in FIG. 2, the Optical Distribute Network (ODN), as a passive splitter, permits downstream data from the OLT to be transmitted to each ONU through optical splits; similarly, the ODN permits the upstream data from the ONU to be transmitted to the OLT through convergence. OLT transmits flows of multicast group G1, G2 and G3 over the transmission channel of a GEM port with a port ID labeled as P1.

FIG. 3 shows is a schematic diagram illustrating the scheme that the downstream multicast flows from the OLT are transmitted over multiple GEM ports. As shown in FIG. 3, OLT transmits flows of multicast group G1 through the transmission channel of a GEM port with port ID labeled as P1, and transmits flows of multicast group G2 and G3 through the transmission channel of a GEM port with port ID labeled as P2.

FIG. 4 shows the internal configuration of an ONT device that supports multicast services. As shown in FIG. 4, CPU in the device is configured to control various modules, and GPON protocol processing module is configured to extract a downstream multicast flow from a GTC TC frame sent by OLT and transmit the multicast flow to a Medium Access Control (MAC) bridge. The MAC bridge is connected to the GPON protocol processing module through an internal Ethernet port. The MAC bridge also provides externally visible Ethernet ports for access to multiple user devices.

According to the current standard, in case that a GEM port carries multiple multicast groups, GPON protocol processing module in the ONT entirely receives all the multicast data carried by the GEM port, and then transmits the received data to the MAC bridge through the internal Ethernet port. To prevent multicast flows from being broadcasted in the MAC bridge, Internet Group Management Protocol snooping (IGMP snooping) is used to transmit multicast flows on demand in the prior art.

As shown in FIG. 5, the ONT supports the IGMP snooping function. A user CPE1 sends an IGMP message to join a multicast group G1, and the multicast flow is transmitted only to the port which has received the IGMP message.

As shown in FIG. 6, if the user CPE1 sends an IGMP message to join an unauthorized multicast group G1, the ONT cannot filter multicast flows, and thus continue transmitting unauthorized multicast flows to CPE1.

Thereby, the prior art has the following problems:

Under the current standard, in the case that an ATM PVC or a GEM port carries multiple multicast groups, since the IGMP snooping of ONT restricts only the port which is adapted to transmit the multicast flows, it is not possible to judge whether a user is joining an authorized or an unauthorized multicast group. If the user joins an unauthorized multicast group, the multicast data can also be transmitted to the user. In other words, it fails to filter the unauthorized multicast data.

SUMMARY OF THE INVENTION

An embodiment of the present invention provides a system, apparatus and method for controlling multicast flows in a passive optical network to prevent an ONT from receiving unauthorized multicast data, and enhance multicast security of the whole GPON system.

The method for controlling multicast flows in a passive optical network, including steps of: receiving, by an optical network terminal, multicast data sent by an optical line terminal; and determining whether the received multicast data satisfies a multicast right control condition. The received multicast data is transmitted to the user side if it satisfies the multicast right control condition; otherwise, it is discarded.

Preferably, a multicast right control table is set in the optical network terminal to record authorized multicast groups.

Determining whether the received multicast data satisfies a multicast right control condition is: determining whether the received multicast data pertains to the authorized multicast groups recorded in the multicast right control table.

Preferably, prior to determining whether the received multicast data satisfies a multicast right control condition, it is determined whether the optical network terminal supports the multicast right control condition. If the optical network terminal supports the multicast right control condition, the following steps are performed; otherwise, the multicast data is transmitted to the user side.

The multicast right control table is a multicast right control table in an ONT-port-based control mode and/or in an ONT-based control mode.

Preferably, the multicast right control table in an ONT-port-based control mode is a table indicating the mapping relationship between ONT ports and multicast groups.

Preferably, the multicast right control table in an ONT-based control mode is configured to control multicast data based on internal ports of the Optical Network Terminal, or a Medium Access Control bridge, or the whole Optical Network Terminal; the multicast right control table in an ONT-port-based control mode is configured to control multicast data based on ports external to the Optical Network Terminal.

The ports external to the Optical Network Terminal include Ethernet ports and/or subscriber digital line ports.

The multicast group is represented as a multicast group based on a multicast IP address, a multicast group based on a source IP address and a multicast IP address, or a multicast group based on a multicast Medium Access Control address.

Configuration modes of the multicast right control table includes: configuring the Optical Network Terminal through an optical line terminal management and control interface, or configuring the Optical Network Terminal through TR069 protocol.

Preferably, configuring the Optical Network Terminal by an optical line terminal management and control interface includes: allocating a multicast right control strategy to the optical line terminal by configuring the management and control interface, wherein the multicast right control strategy is preserved in the Optical Line Terminal, and setting data of the multicast right control strategy for the Optical Network Terminal to the Optical Network Terminal through a channel of the management and control interface.

An embodiment of the present invention provides a passive optical network terminal, including: a passive optical network protocol processing module, a Medium Access Control bridge module, and a multicast right control module configured to receive multicast data processed by the passive optical network protocol processing module, determine whether the multicast data satisfies a multicast right control condition, and transmit the multicast data to a port at the user side or discard the multicast data, according to the determining result.

The multicast right control module is set in the Medium Access Control bridge module, or in the passive optical network protocol processing module, or provided as a separate module.

Preferably, the passive optical network terminal preserves a multicast right control table to be inquired by the multicast right controlling module to determine whether the multicast data satisfies the multicast right control condition.

The multicast right control table is a table in ONT-port-based control mode and/or a table in ONT-based control mode.

An embodiment of the present invention also provides a passive optical network line terminal, including: a multicast right control strategy module for an optical network terminal, configured to preserve a multicast right control strategy for the optical network terminal and to allocate the preserved multicast right control strategy to the optical network terminal.

Preferably, the passive optical network line terminal further includes a configuration management port configured to receive the multicast right control strategy for the optical network terminal.

An embodiment of the present invention further provides a system for controlling multicast flows in a passive optical network, including: an optical line terminal, an optical distribution network and an optical network terminal; wherein the optical network terminal is configured to receive multicast data distributed by the optical line terminal through the optical distribution network, determine whether the multicast data satisfies a multicast right control condition, and transmit the multicast data to a port at the user side or discard the multicast data according to the determining result.

Preferably, the optical line terminal is further configured to distribute a multicast right control strategy to the optical network terminal; the optical network terminal is configured to preserve the received multicast right control strategy as a multicast right control table in an ONT-port-based control mode and/or a multicast right control table in an ONT-based control mode.

Distributing a multicast right control strategy to the optical network terminal includes: the optical line terminal distributes the multicast right controlling strategy to the optical network terminal through a channel of the management and control interface.

The present invention has the following beneficial effects:

The present invention solves the problem in the prior art that flows of unauthorized multicast group can be received when a user is added into an unauthorized multicast group in a PON system. Receiving unauthorized multicast data at ONT is prohibited, which enhances the multicast security of the GPON system. For IPTV providers, the present invention can prevent users from watching unauthorized programs, and thus improves business income.

DETAILED DESCRIPTION OF THE EMBODIMENTS

The present invention will be further described with reference to the accompanying figures and embodiments.

I. The Introduction of Multicast Right Control Point

Depending on the location of an ONT, the ONT is capable of providing service for a single family user (FTTH mode) or multiple family users (FTTB mode).

Figure 1:
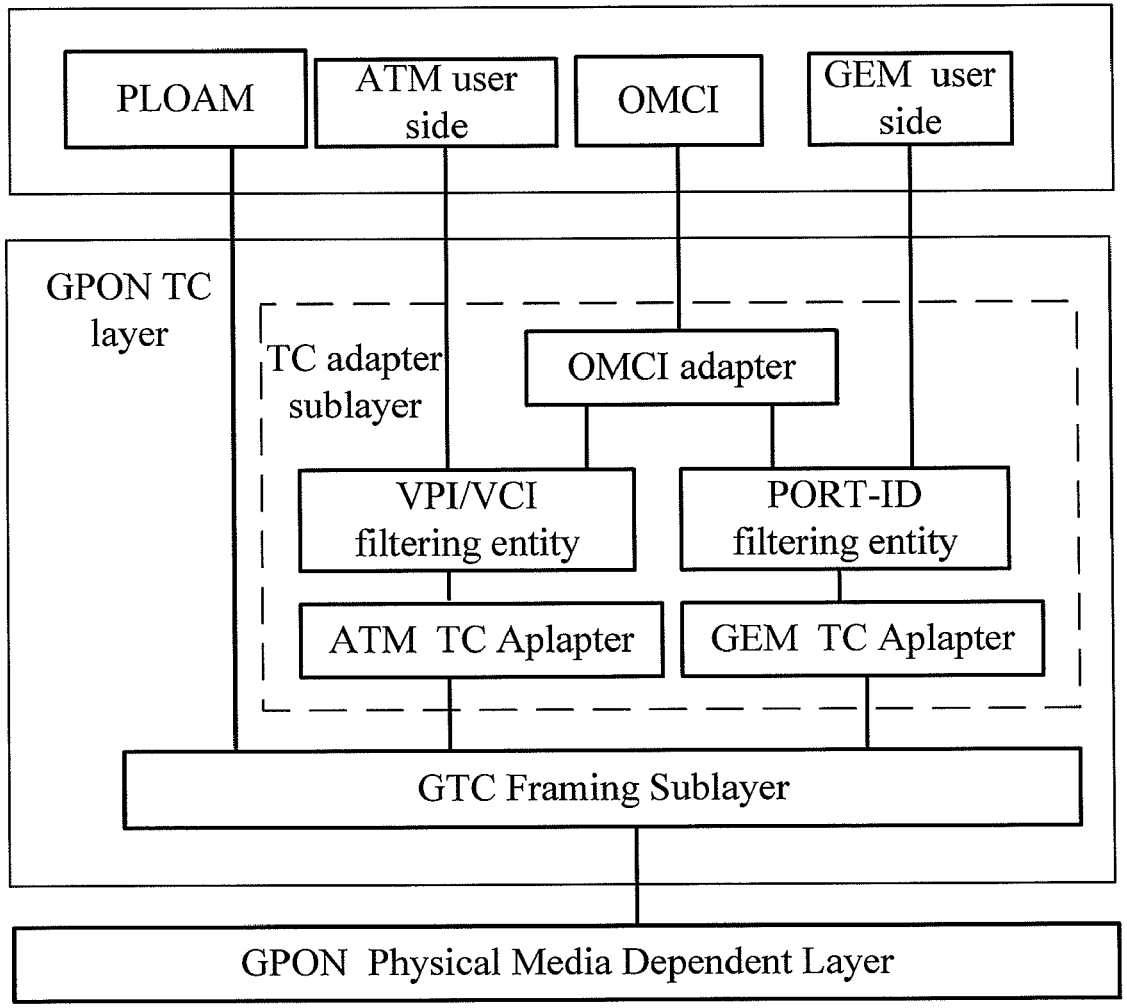
FIG. 1 shows the architecture of a GPON standard protocol stack.
Figure 2:
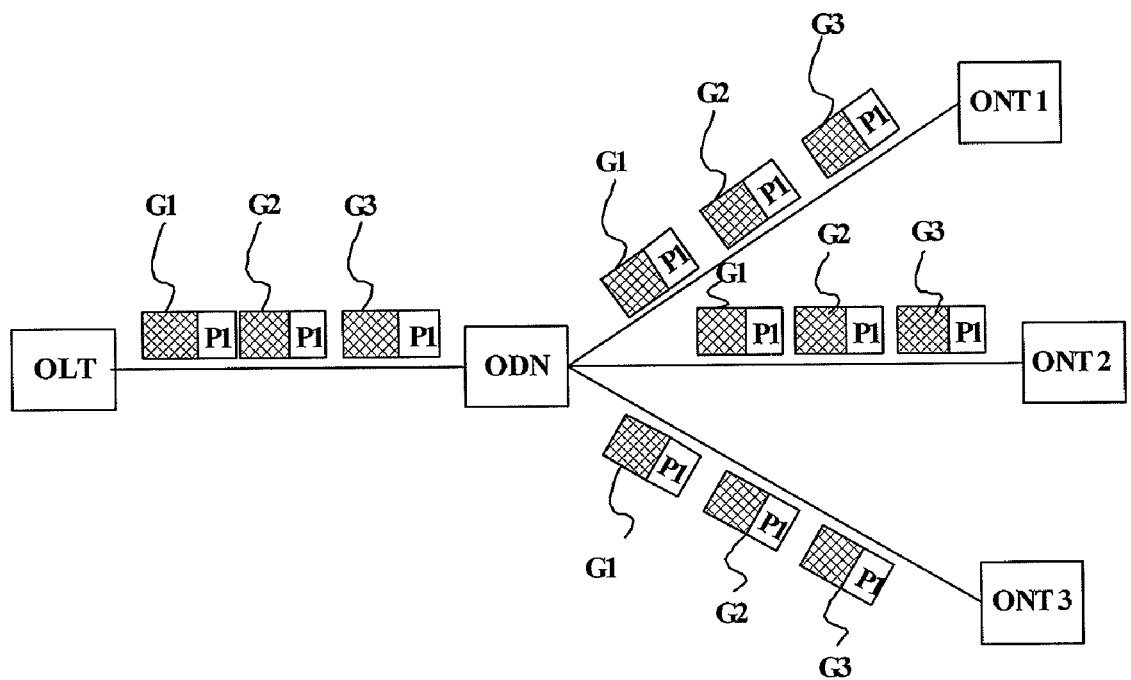
FIG. 2 is a schematic diagram illustrating the scheme that all the multicast flows pass through a same GEM port.
Figure 3:
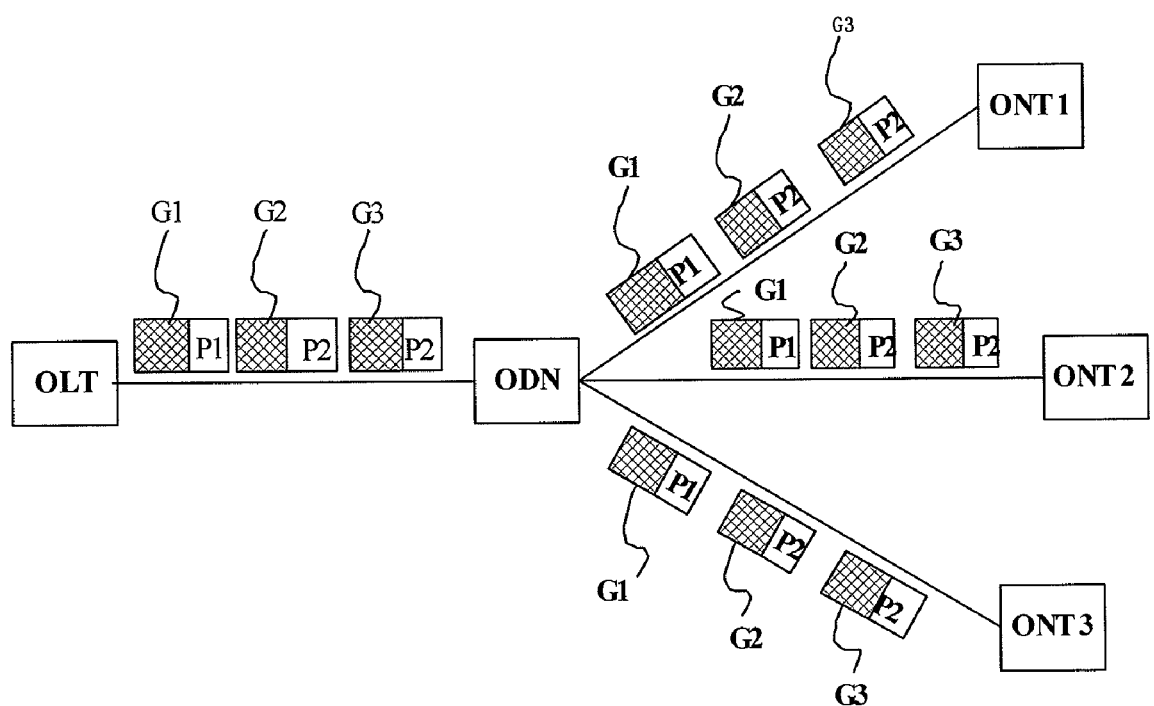
FIG. 3 is a schematic diagram illustrating the scheme that the downstream multicast flows from OLT pass through multiple GEM ports.
Figure 4:
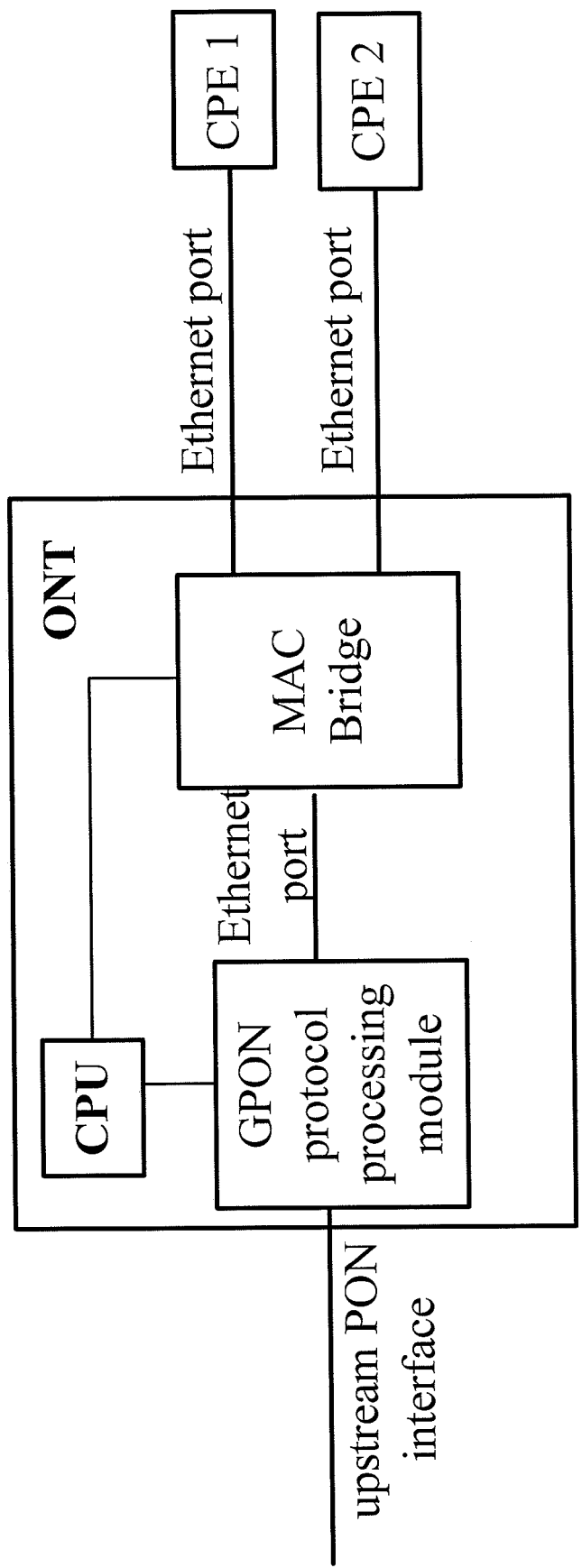
FIG. 4 shows an internal configuration of an ONT device which supports multicast services.
Figure 5:
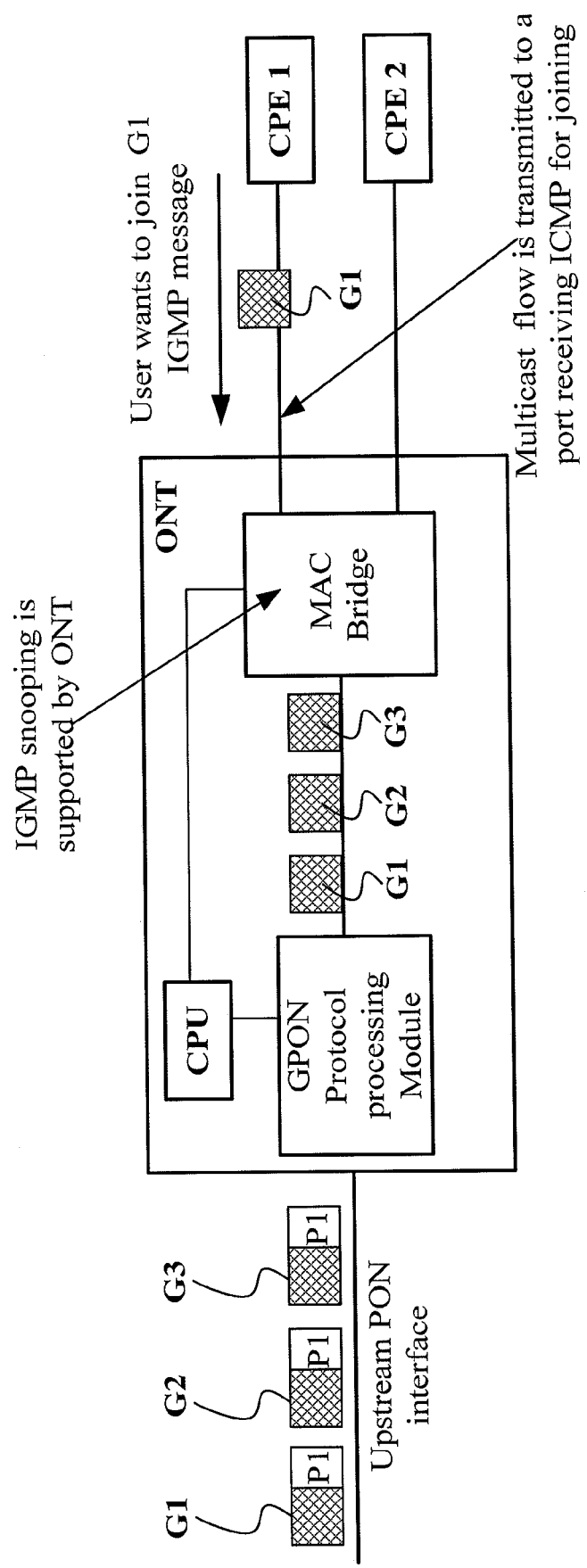
FIG. 5 is a schematic diagram illustrating that an ONT uses IGMP snooping to transmit multicast flows on demand.
Figure 6:
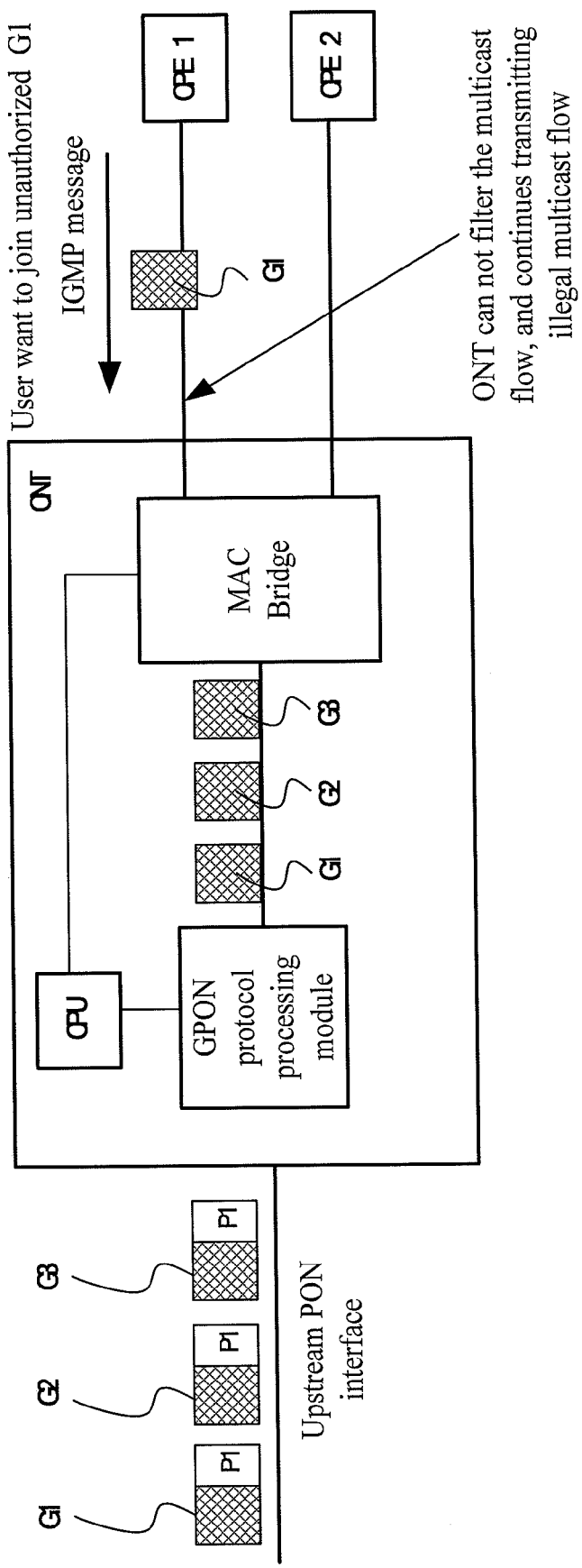
FIG. 6 is a schematic diagram illustrating a multicast transmission of flows when a user is joining an unauthorized multicast group.
Figure 7:
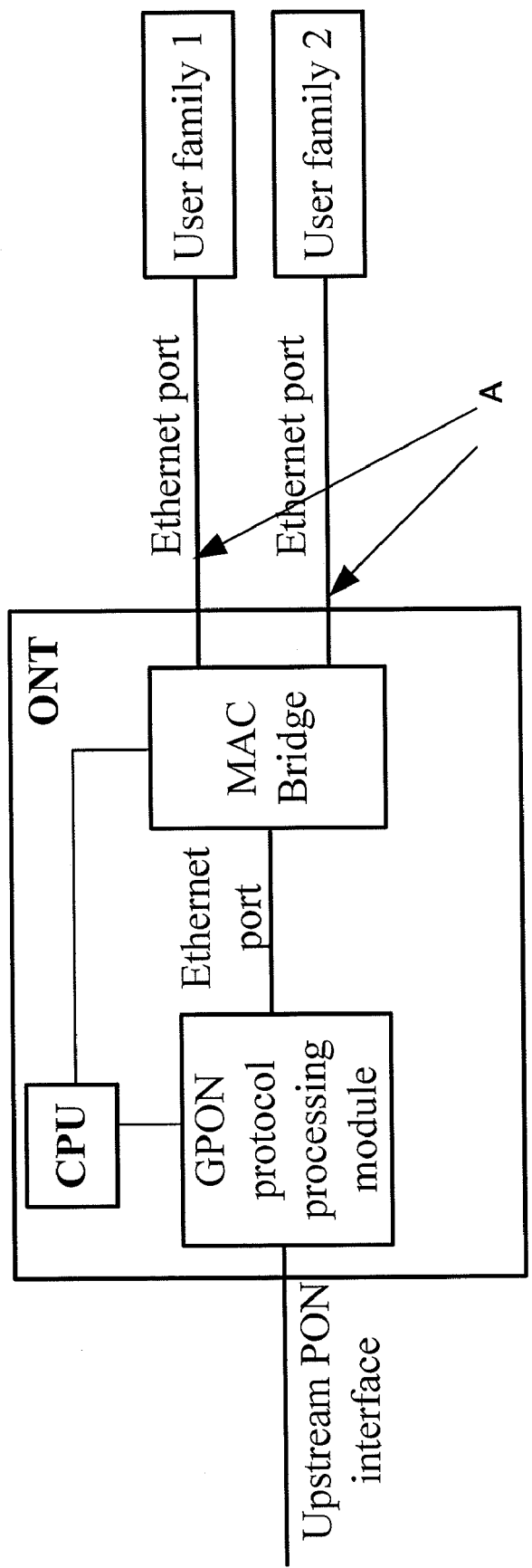
FIG. 7 is a schematic diagram illustrating the position of a multicast right control point of an ONT serving multiple users.
Figure 8:
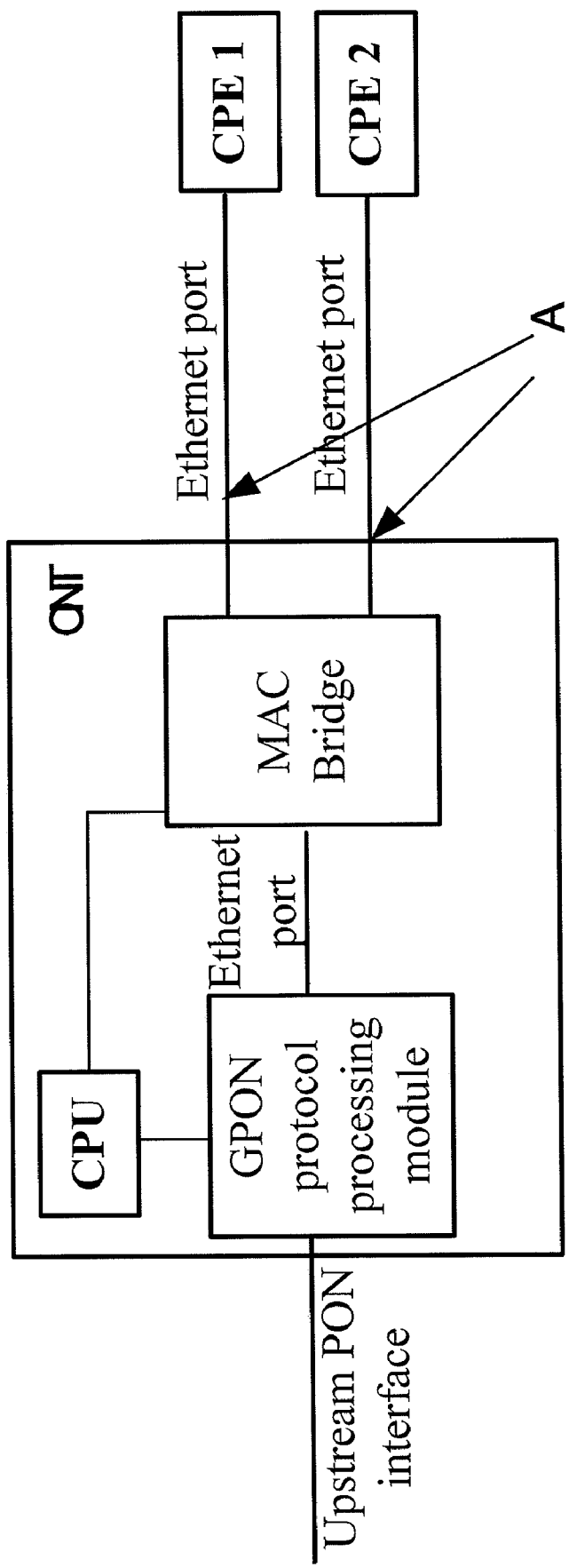
FIG. 8 shows multicast right control points of an ONT serving a single user while each CPE has a different multicast right.

As shown in FIG. 7, if the ONT serves multiple family users connected with the ONT through Ethernet ports and each family user has a different multicast right, the multicast right control points shall be located on the Ethernet port (as indicated by 'A' in the figure) providing access to the user;

FIG. 8 shows control points in the case that an ONT serves a single user while each CPE has a different multicast right. In the case that the ONT only serves a single family user, the ONT accesses multiple CPEs of the single family user through Ethernet ports. If each device connecting to the Ethernet ports has a different multicast right, i.e., each CPE has a separate multicast right, the multicast right control points shall be located on the Ethernet ports (as indicated by 'A' in the figure).

Figure 9:
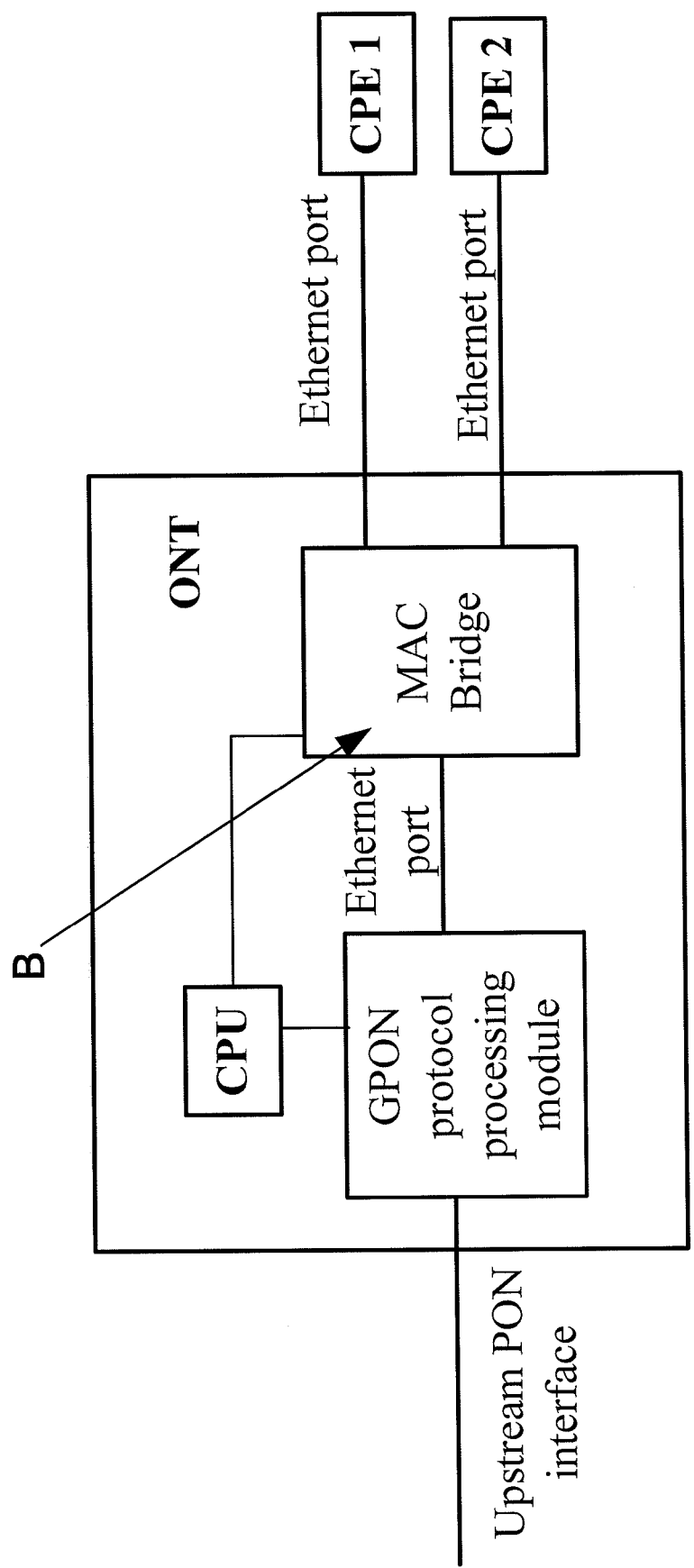
FIG. 9 shows multicast right control points of an ONT serving a single user while each CPE has the same multicast right.

FIG. 9 shows multicast right control points in the case that an ONT serves a single user while all the CPEs have the same multicast right. The ONT accesses to multiple CPEs of the single user family through Ethernet ports, and all of CPEs have the same multicast right. Accordingly, the multicast right control points shall be located on the internal port of the Ethernet or the whole MAC bridge, or the whole ONT (as indicated by 'B' in the figure).

An ONT in the FTTBusiness mode serves multiple users in the same way as that in the FTTB mode, i.e., multicast right control is also applied on external Ethernet ports.

Based on the above description, there exist two multicast right control points, including:

1. Ports external to ONT. Any port supporting multicast is applicable, including but not limited to an Ethernet port and/or digital subscriber line port, wherein the digital subscriber line port includes ADSL port, VDSL port, etc. A control mode based on ports external to the ONT is hereinafter referred as ONT-port-based control mode;

2. Based on an internal Ethernet port, or MAC bridge, or the whole ONT; a control mode based on an internal port is hereinafter referred as ONT-based control mode.

Note: the ports external to ONT is not limited to Ethernet port; all types of ports supporting multicast are applicable, such as various DSL ports (ADSL, VDSL, etc.).

II. Introduction of Multicast Right Control table

Depending on the different multicast right control points, there exist two multicast right control tables:

1. A multicast right control table in the ONT-port-based control mode, as shown in Table 1:

TABLE 1

| ONT Port 1 | Multicast group list 1 |
| ONT Port 2 | Multicast group list 2 |
| ONT Port 3 | Multicast group list 3 |

The above multicast right control table describes the multicast right of each ONT port.

Multicast group lists authorizing ONT ports to be added in are preserved in association with the ONT port as index. The realization method of the multicast table is not limited to the above. For example, a multicast group can be indexed to port lists which are authorized to be added in the multicast group. In this way, multicast right control table is as shown in Table 2:

TABLE 2

| Multicast group 1 | ONT port list 1 |
|---|---|
| Multicast group 2 | ONT port list 2 |
| Multicast group 3 | ONT port list 3 |

2. A multicast right table in ONT-based control mode, as shown in Table 3:

TABLE 3

| Multicast group list 1 |
|---|
| Multicast group list 2 |
| Multicast group list 3 |

It should be noted that, there is a point-to-multipoint mapping relationship between multicast groups and ONT ports, i.e., a multicast group may transmit multicast flows to multiple ONT ports, and an ONT port may transmit flows of multiple multicast groups at the same time. A multicast group can be represented in three ways:

(1) Multicast group represented by a multicast IP address;
(2) Multicast group represented by a source IP address and a multicast IP address; and
(3) Multicast group represented by a multicast MAC address.

Accordingly, in the multicast flow transmission process hereinafter, multicast right control is required to support any of the above three representation. For example, multicast flow can be determined based on the multicast MAC address, multicast IP address or the association of source IP address and multicast IP address.

III. Internal Structure of ONT Providing Multicast Right Control

Figure 10:
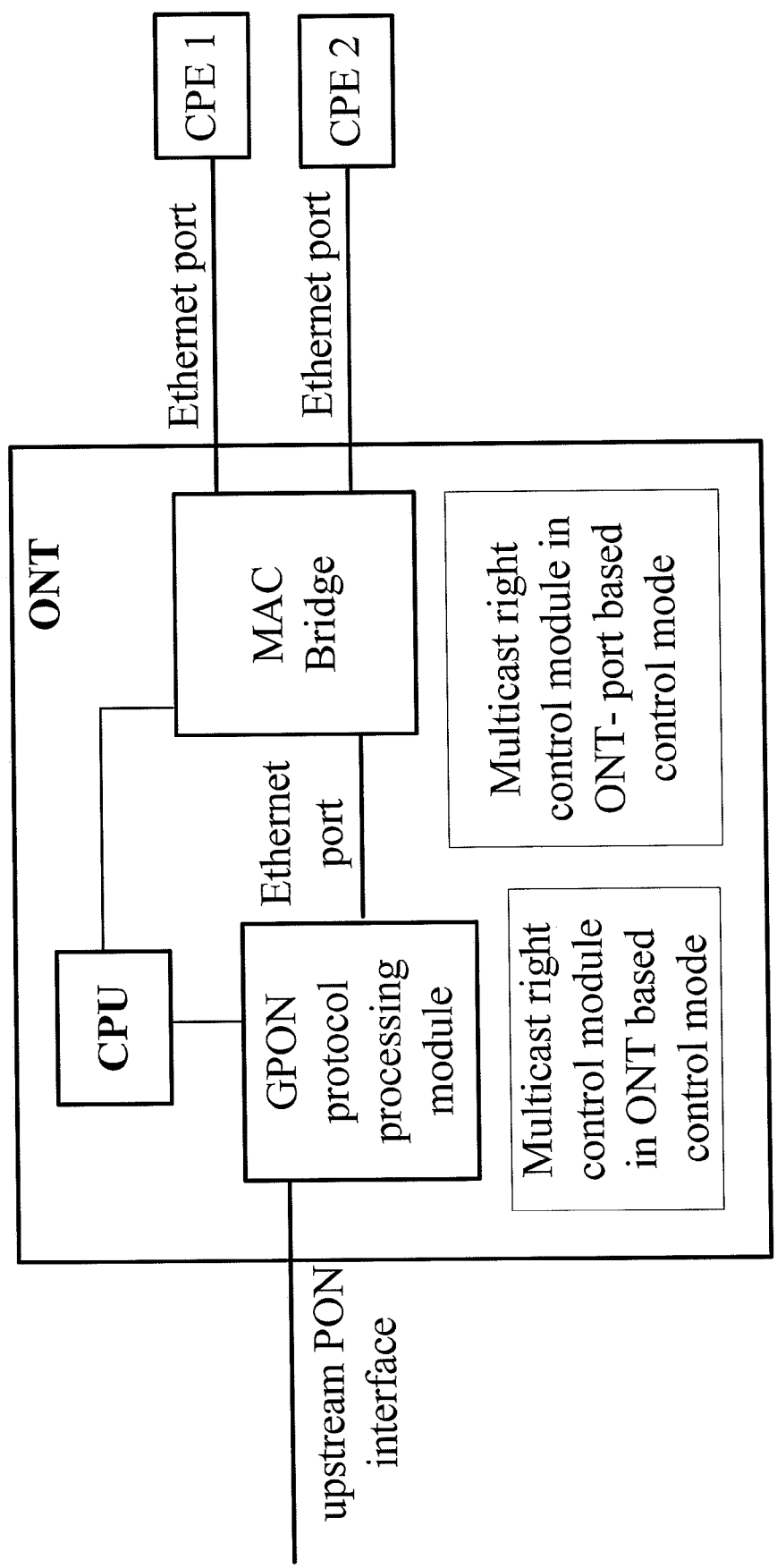
FIG. 10 shows a block diagram of an ONT providing multicast right control according to an embodiment of the present invention.

As shown in FIG. 10, two multicast right control modules are added into the ONT, referred as multicast right control module in an ONT-port-based control mode and multicast right control module in an ONT-based control mode respectively. Each module preserves corresponding control table, which is referred to as a multicast right control table in ONT-port-based control mode and a multicast right control table in ONT-based control mode respectively. The ONT may only support one of the above-mentioned two multicast right control tables, or both.

IV. Multicast Right Control Process of ONT

Figure 11:
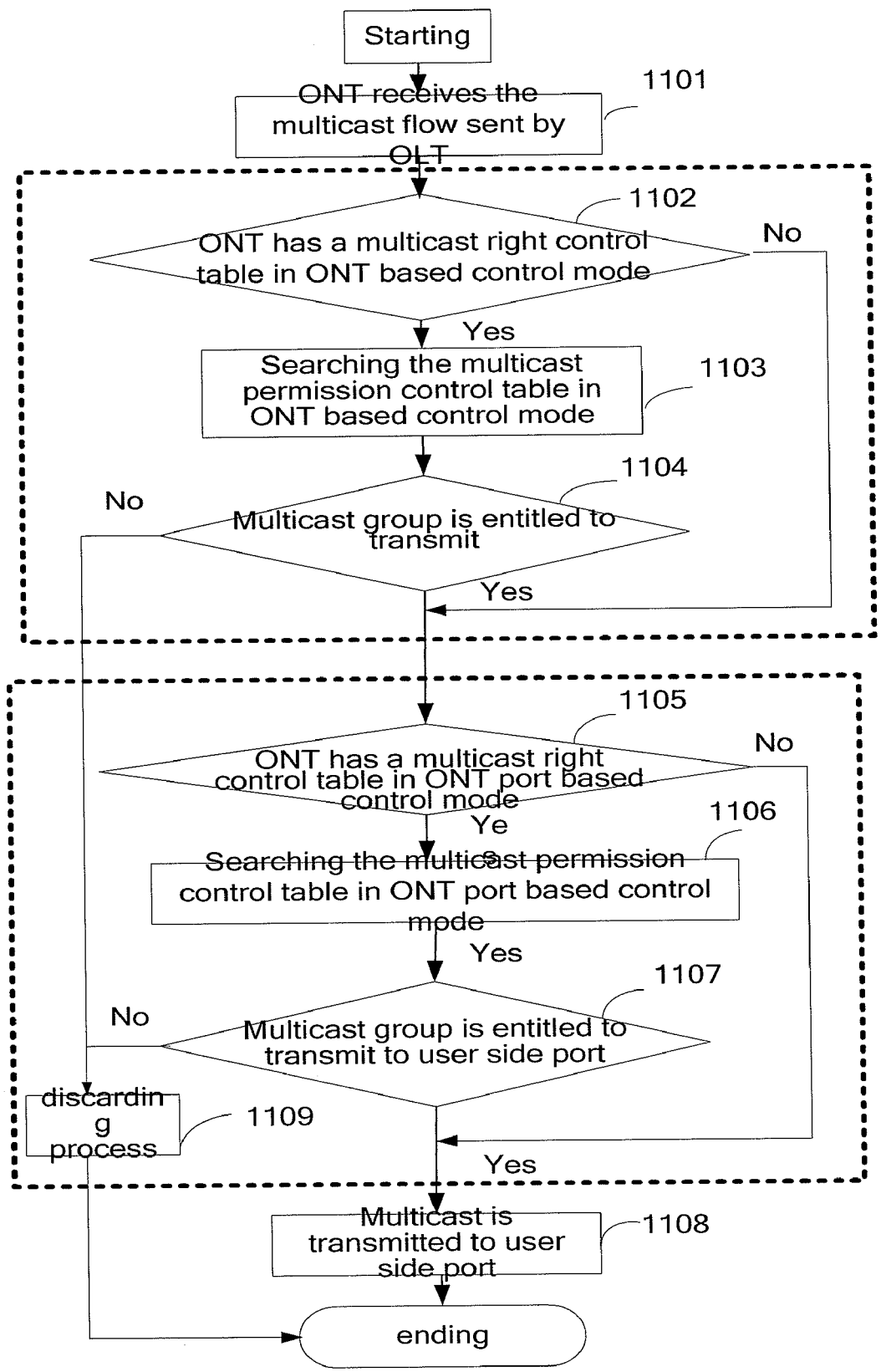
FIG. 11 shows a flowchart of an ONT providing multicast right control according to an embodiment of the present invention.

Under the control of multicast right control module, as shown in FIG. 11, the processing steps in the dashed line frame are newly-added. Those steps in the first dashed line frame relate to the multicast right control process in the ONT-based control mode, and those steps in the second dashed line frame relate to the multicast right control process in the ONT-port-based control mode. Both processes can either be applied concurrently, or only one of them is chosen. The complete steps for applying both process concurrently include:

Step 1101: ONT receives the multicast data sent by OLT for subsequent processing by the multicast right control module;

Step 1102: When the multicast right control module receives the multicast data, it determines whether ONT has a multicast right control table in the ONT-based control mode. If ONT has the multicast right control table, the process proceeds to Step 1103; if ONT does not have the multicast right control table, the process proceeds to Step 1105;

Steps 1103-1104: The multicast right control module searches the multicast right control table in ONT-based control mode and determines whether the multicast data received is authorized for transmission by the multicast right control table. If the multicast data received is authorized for transmission by the multicast right control table, the process proceeds to step 1105; otherwise, the process proceeds to Step 1109;

Step 1105: The multicast right control module determines whether the ONT has a multicast right control table in ONT-port based control mode. If the ONT has a multicast right control table in ONT-port based control mode, the process proceeds to Step 1106; otherwise, the process proceeds to Step 1108.

Steps 1106-1107: The multicast right control module determines whether the received multicast packets are authorized by a multicast right control table in ONT-port based control mode for transmission to a destination Ethernet port. If the multicast message received is authorized by the multicast right control table in ONT port based control mode, the process proceeds to Step 1108; otherwise, the process proceeds to step 1109.

Step 1108: ONT transmits the multicast data to a port at the user side and this process ends.

Step 1109: ONT discards the multicast data and this process ends.

In the above process, if steps 1102-1104 in the first dashed line frame are omitted, the ONT only supports the ONT-port-based control mode; if steps 1105-1107 in the second dashed line frame are omitted, and the ONT only supports the ONT-based control mode.

V. Configuration of Multicast Right Control Table of ONT

ONT realizes the multicast right control by means of a multicast right control table; the control strategy of the multicast right control table is realized by configuring the multicast right control table. The specific configuration mode supports but not limited to the followings:

1. Configuring ONT in OMCI mode;
2. Configuring ONT in TR069 protocol mode.

Figure 12:
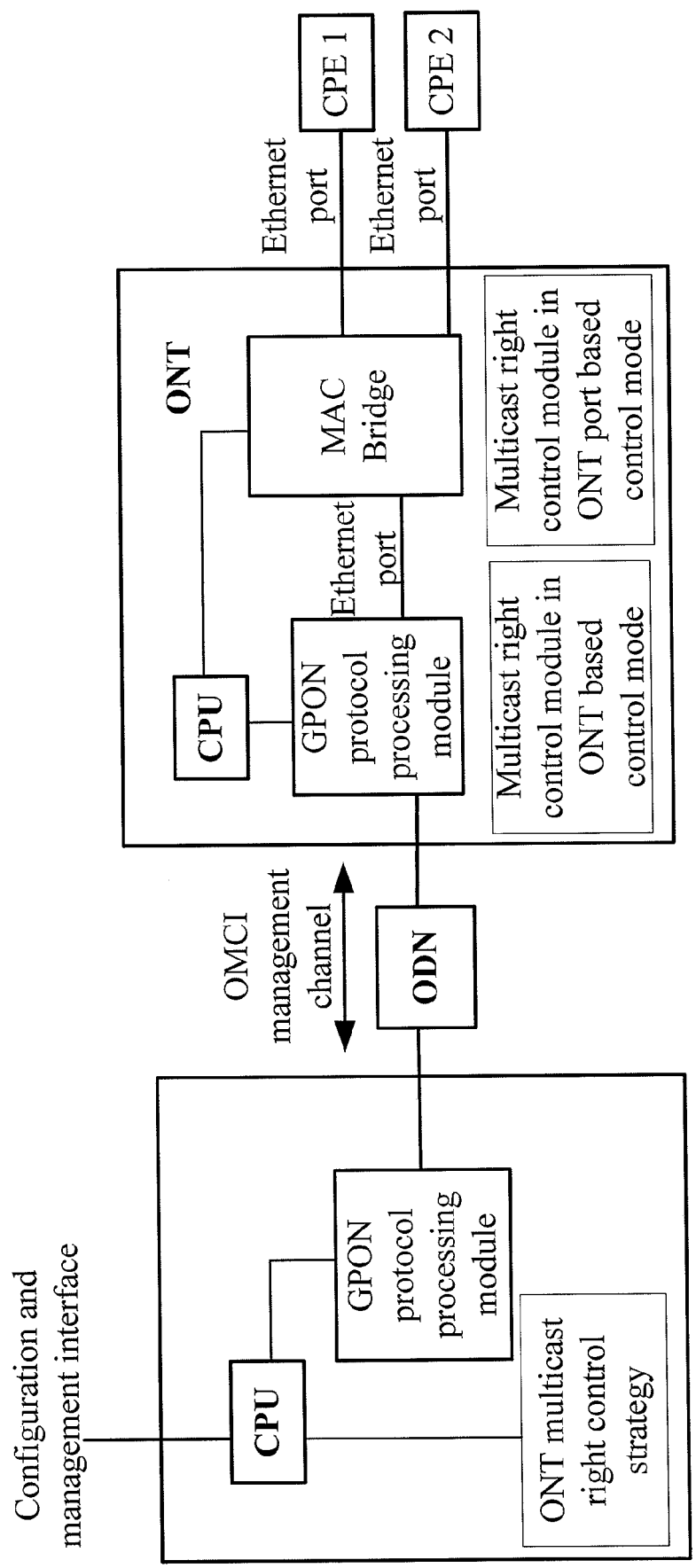
FIG. 12 illustrates a system of configuring ONT multicast right by means of OMCI according to an embodiment of the present invention.

For the first configuration mode, the system architecture is shown in FIG. 12:

OMCI is a transmission channel defined by GPON standard. The OMCI channel is established between OLT and ONT when ONT registers to OLT. The OMCI is subjected to a master-slave management protocol, wherein the OLT is the master device and the ONT is the slave device. The OLT controls multiple ONTs connected with the OLT through an OMCI channel.

In the OMCI protocol, various data for OLT to manage ONT are abstracted into a protocol-independent management information base (MIB) in which a Manage Entity (ME) is a basic information unit. Based on various configurations of ONT, OMCI defines various MEs for OLT to control ONT. ONT performs configuration and management function of each ME under control of OLT.

In embodiments of the present invention, two corresponding MEs are defined for setting the multicast right control table in the ONT through OMCI.

1. The multicast right ME in ONT-based control mode: responsible for setting the multicast rights of the whole ONT.

The multicast right ME in ONT-based control mode includes definitions as shown in Table 4:

TABLE 4

| Serial Number | Properties of Multicast Group |
| --- | --- |
| Multicast Group 1 | Multicast Groups represented by the above three ways |
| Multicast Group 2 | Multicast Groups represented the above three ways |
| ... | ... |
| Multicast Group m | Multicast Groups represented by the above three ways |

In Table 4, 'm' represents the number of multicast groups supported by ONT, and the number is determined by the system.

2. The multicast right ME in ONT-port-based control mode: responsible for setting the multicast rights for specific ports of ONT.

The multicast right ME in ONT-port-based control mode includes property definitions as shown in Table 5:

TABLE 5

Number of ONT Port

| Serial Number | Properties of Multicast Group |
| --- | --- |
| Multicast Group 1 | Multicast Groups represented by the above three ways |
| Multicast Group 2 | Multicast Groups represented by the above three ways |
| ... | ... |
| Multicast Group n | Multicast Groups represented by the above three ways |

In Table 5, 'n' represents the number of multicast groups supported by ONT ports, and the number is determined by the system.

As shown in FIG. 12, the OLT preserves the ONT multicast right control strategy which is allocated to the OLT by a configuration and management port. OLT sets the data of ONT multicast right control strategy of OLT to the ONT through OMCI channel to generate the multicast right control table in ONT-based control mode and/or the multicast right control table in ONT-port-based control mode The invention can prevent ONT from receiving unauthorized multicast data, and thus enhances the multicast security of the whole GPON system. For an IPTV provider, the present invention can prevent users from watching unauthorized programs, and thus can increase business income of the IPTV provider.

In addition to above-mentioned methods, the invention further provides a passive optical network terminal, as shown in FIG. 10, including a passive optical network protocol processing module, a MAC bridge module and a multicast right control module. The multicast right control module receives multicast data processed by the passive optical network protocol processing module and determines whether the multicast data has been authorized for transmission by the multicast right control table preserved. If the multicast data is authorized for transmission by the multicast right control table, the multicast data is transmitted to the user side through the MAC bridge; otherwise, the multicast data is not transmitted. The multicast right control module may be set inside the MAC bridge, or provided as a separate module.

Further, the invention also provides a system for controlling multicast flow in a passive optical network, as shown in FIG. 12, including an OLT, an ODN and an ONT. The ONT further includes a multicast right control module. The multicast right control module receives multicast data processed by the passive optical network protocol processing module inside the ONT and determines whether the multicast data is authorized for transmission by the multicast right control table preserved. If the multicast data is authorized for transmission by the multicast right control table, the multicast data is transmitted to the user side through the MAC bridge inside the ONT; otherwise, the multicast data is not transmitted. The multicast right control module may be set inside the MAC bridge, or provided as a separate module.

Further, an ONT multicast right control strategy module for preserving ONT multicast right control strategies is set inside the OLT. The OLT allocates the ONT multicast right control strategy to the ONT through an OLT management and control interface (OMCI) channel between the OLT and the ONT.

It should be apparent to a person skilled in the art that, various changes or modifications can be derived from the present invention without departing from the scope of the present invention. The above description is only to illustrate embodiments of the invention, not for limiting the scope of the invention. Any equivalent modification or change resulted from the present invention shall be regarded to be included in the scope defined by the accompanying claims.

What is claimed is:

1. A method for controlling multicast flow in passive optical network, comprising:
   providing a first multicast right control table and a second multicast right control table in an optical network terminal (ONT), the first multicast right control table being in an ONT-based control mode to indicate authorized multicast groups of the ONT, the second multicast right control table being in an ONT-port-based control mode to indicate mapping relationships between ONT ports and multicast groups;
   receiving, by the ONT, multicast data sent by an optical line terminal (OLT);
   determining whether the multicast data is authorized for transmission by searching the first multicast right control table in the ONT-based control mode;
   upon determining that the multicast data is authorized for transmission, determining whether the multicast data is authorized for transmission to a destination port by searching the second multicast right control table in the ONT-port-based control mode; and
   transmitting the multicast data to the destination port of the user side upon determining that the received multicast data is authorized for transmission to the destination port; otherwise, discarding the multicast data.

2. The method of claim 1, wherein the first multicast right control table in the ONT-based control mode is configured to control the multicast data based on internal ports of the Optical Network Terminal or the whole Medium Access Control bridge, or the whole Optical Network Terminal; the second multicast right control table in the ONT-port-based control mode is configured to control the multicast data based on ports external to the Optical Network Terminal.

3. The method of claim 2, wherein the ports external to the Optical Network Terminal comprises an Ethernet port and/or a subscriber digital line port.

4. The method of claim 1, wherein the multicast groups are represented as a multicast group based on multicast IP address, based on a source IP address and multicast IP address, or based on a multicast Medium Access Control address.

5. The method of claim 1, wherein the providing the first and second multicast right control tables in the ONT comprises: configuring the multicast right control tables in the ONT through an optical line terminal management and control interface, or configuring the multicast right control tables in the ONT through TR069 protocol.

6. The method of claim 5, wherein the configuring of the multicast right control tables in the ONT through an optical line terminal management and control interface comprises:
   allocating a multicast right control strategy to the OLT by configuring the management and control interface, wherein the multicast right control strategy is preserved in the OLT;
   setting, to the ONT, data of the multicast right control strategy of the ONT, through a channel of the OLT management and control interface.

7. A passive optical network terminal, comprising a passive optical network protocol processing module and a Medium Access Control bridge module, wherein
   the passive optical network terminal further comprises a multicast right control module configured to receive multicast data processed by the passive optical network protocol processing module, determine whether the multicast data satisfies a multicast right control condition by searching a first multicast right control table in an ONT-based control mode and a second multicast right control table in an ONT-port-based control mode, and transmit the multicast data to a port at the user side or discard the multicast data, according to the determining result;
   wherein the first multicast right control table is configured to indicate authorized multicast groups of the ONT, and the second multicast right control table is configured to indicate mapping relationships between ONT ports and multicast groups.

8. The passive optical network terminal of claim 7, wherein the multicast right control module is set in the Medium Access Control bridge module, or in the passive optical network protocol processing module, or provided as a separate module.

9. The passive optical network terminal of claim 7, wherein the multicast right control module comprises a multicast right control module in an ONT-port-based control mode and a multicast right control module in an ONT-based control mode.

10. The passive optical network terminal of claim 7, wherein the second multicast right control table in ONT-port-based control mode is preserved in the multicast right control module in an ONT-port-based control mode, and
   the first multicast right control table in ONT-based control mode is preserved in the multicast right control module in an ONT-based control mode.

11. A system for controlling multicast flow in a passive optical network, comprising: an optical line terminal, an optical distribution network and an optical network terminal; wherein,
   the optical network terminal is configured to receive multicast data distributed by the optical line terminal through the optical distribution network, determine whether the multicast data satisfies a multicast right control condition by searching a first multicast right control table in an ONT-based control mode and second multicast right control table in an ONT-port-based control mode, and transmit the multicast data to a port at the user side or discard the multicast data according to the determining result,
   wherein the first multicast right control table is configured to indicate authorized multicast groups of the ONT, and the second multicast right control table is configured to indicate mapping relationships between ONT ports and multicast groups.

12. The system of claim 11, wherein,
   the optical line terminal is further configured to distribute a multicast right control strategy to the optical network terminal; and
   the optical network terminal is configured to preserve the received multicast right control strategy as the second multicast right control table in ONT-port-based control mode and the first multicast right control table in ONT-based control mode.

13. The system of claim 12, wherein, the distributing a multicast right control strategy to the optical network terminal comprises:
   the optical line terminal distributes the multicast right control strategy to the optical network terminal through a channel of the management and control interface.

* * * * *